INVENTOR.
NORMAN MILLERON
BY
ATTORNEY.

Jan. 3, 1961

N. MILLERON 2,967,257

ION PUMP

Filed April 24, 1959

INVENTOR.
NORMAN MILLERON

BY
ATTORNEY.

United States Patent Office 2,967,257
Patented Jan. 3, 1961

2,967,257
ION PUMP

Norman Milleron, Berkeley, Calif., assignor to the United States of America as represented by the United States Atomic Energy Commission Filed Apr. 24, 1959, Ser. No. 808,857

20 Claims. (Cl. 313—231)

This invention relates in general to ion pumps and to methods of use thereof for maintaining low vacuum pressures and more specifically this invention relates to an improved ion pumping structure and method in which pumping action is brought about by absorbing gaseous particles into a liquid gettering material.

The term "liquid gettering metal" is meant to include any metal or mixture of metals or alloy of metals which, when heated or otherwise maintained in its liquid state, has a tendency to absorb or enter into an absorption-desorption relationship with a surrounding charged or uncharged gaseous atmosphere. Degassing may be necessary with certain metals in order to create an absorption equilibrium at low pressures, but unless otherwise, stated as used herein, the term is meant to include only metals which are partially degassed. The absorption mechanism may include chemi-sorption and other sorption phenomena as discussed hereinafter. Other liquids having the requisite properties may be substituted for liquid metals, and the term is meant to include such liquids as may be equivalent.

The invention provides ion pump structure in which neutral gas particles are ionized and thereafter prevented from migrating away from the pumping cavity back into the area being evacuated. In order to accomplish this function a relatively gas-free liquid gettering metal or other suitable gettering liquid having a low vapor pressure is disposed preferably, but not necessarily, on the surface of a cathode electrode to receive the ions and neutral particles therein. A portion of the liquid metal is alternatively continuously withdrawn from the pump and desorbed. In the preferred embodiment an amount of the liquid having properties discussed hereinafter is also continuously vaporized within the pumping cavity by a novel wick means to provide a partial residual pressure of metal vapor. This flux of metal vapor from the hot wick serves to support and maintain an electric discharge a similar to a discharge in a low pressure gas. Thus by this wick means a continuous electric discharge is maintained independent of the neutral gas pressure outside of the pump volume. The indicated efficiency of the pump is very high for given metals and gases since virtually absolute absorption in the liquid of all contacting ionized gaseous particles is achieved. A partial pressure of metal vapor in the pump volume is also maintained by sputtering of ions impinging on the liquid cathode material.

In the low vacuum pressure are vacuums lower than $10^{-6}$ mm. Hg were generally not required or thought to be desirable prior to nuclear applications in the 1940's. Pressures of even this magnitude were found only in limited scientific research, generally only where low volumes were being pumped, i.e., hundreds of liters per second or less. For this purpose mechanical pumps and diffusion pumps were admirably suited. However, in the present technology of mass spectroscopy, particle accelerators, controlled thermonuclear reactions, electronic applications, space research, and associated fields, threshold pressures are frequently much lower. For example, random gas particles may produce erroneous results in mass spectroanalysis of extremely small or pure samples, and nuclear reaction thresholds may be contingent upon pressures as low as $10^{-10}$ mm. Hg or lower.

Typical optimum requirements for vacuum pumps in modern technology are exemplified in plasma containment experiments, accelerator systems and ion sources in which an almost absolute gaseous source sink relationship must be maintained. In the use of such equipment, energetic charged particles and energetic neutral particles are continuously introduced or produced in the system. The vacuum pump or "sink" must be capable of both initial evacuation and consequent removal of the total output of desirable fast particles and an irreducible amount of slow neutral particles to maintain a very low density of "cold" neutral gas. Optimumly, the fast particles should be removed without initial conversion into slow ones, an operation not possible with diffusion pumps, since fast particles are difficult to entrain by the jets of a diffusion pump. Further, when fast particles are first reduced to slow ones, a larger entrance orifice must be provided, since fast particles can be "shot" through a small aperture, while slow ones can not.

In spite of these difficulties, principal reliance has generally been placed upon diffusion and mechanical pumps because of their high pumping capacity. Diffusion pumps are limited to a pumping pressure of the order of $10^{-6}$ mm. Hg, because at this pressure small amounts of the oil or other pumping liquid used tend to vaporize and diffuse back into the vacuum cavity being pumped. Arbitrarily lower pressures, at reduced evacuation rates, are attained with diffusion pumps by incorporating therewith especially designed traps which contact and condense oil molecules diffusing back into the vacuum area. To attain pressures lower than about $10^{-7}$ mm. Hg in highly kinetic systems, it has been found necessary to place other pumping means in parallel with the diffusion pumps. Several such pumps mainly relied upon have been ion pumps and gettering pumps. In ion pumps gas molecules are ionized and discharged to the atmosphere or are drawn into a gettering cathode. Gettering pumps continuously vaporize or sputter a gettering metal which deposits on surface area to continuously getter random or ionized gas particles impinging thereupon.

While various types of ion pumps have been used in restricted applications, an operational defect has precluded ultra-low pressure, high volume pumping. Specifically, after a short time, ionized gas molecules driven into the cathode plate saturate the cathode material. Thenceforth, every ion driven into the saturated cathode material will release at least one previously trapped particle which is then free to migrate by random thermal motion back into the cavity being evacuated. This places a limitation on the lower pressure attainable and precludes scaling up to pump large volumes of gas. Various means have been heretofore used to trap such neutralized molecules or to reduce their backward migration, but a lower pressure is attained only by diminishing the volume such pumps would otherwise handle.

There has now been discovered a novel apparatus and method for pumping high volumes of gas at ultra-low vacuum pressure which in general is more reliable and overcomes many of the inadequacies of the vacuum pumps of the prior ultra-low vacuum pressure art. The invention is adaptable for combination with the structures and methods of most prior ion pumps. In the most general terms, a liquid gettering metal or other suitable liquid is disposed in combination with ion pump structure to receive both neutral gaseous particles, particularly externally accelerated neutral particles, and ions. The ions may be either created by means within the ion pumping chamber as done in conventional ion pumps, or they may penetrate same from a source exterior thereof. The liquid gettering metal is disposed on either a horizontal or vertical cathode electrode or in combination with other pump structure toward which neutral and ionized particles are directed and accelerated by electric field means alone or preferably by electric and magnetic field means. Such liquid, if disposed in a horizontal receptacle, would preferably have surface area large in relation to the electrode or other surface. If disposed on a vertical or tilted surface, the liquid would preferably be in the form of a continuously falling film. As adapted in a simple preferred embodiment to a Phillips ion gage pump, an upper horizontal ring-shaped cathode permits entry of particles to the pumping area between the cathodes, and the second cathode is a lower horizontal cathode upon which is disposed the liquid gettering metal. These cathodes are surrounded by a cylindrical anode. Additional novelty is provided by variations and refinements, such as plane parallel cathodes surrounded by a grid structure anode.

In the operation of a typical embodiment with the molten or liquid metal disposed on a horizontal lower cathode electrode plate, gas particles are ionized at a constant rate, preferably the maximum rate possible without occurrence of an arc type electrical discharge. The ions are directed toward and accelerated into the plate and into a cupped pool of liquid gettering metal thereon by the electric and magnetic field means. The ions are immediately neutralized, but instead of being desorbed in accordance with an equilibrium which is established, they are gettered or absorbed by the liquid metal into which they have penetrated. Virtually complete trapping of the gaseous particles results.

Further refinements may be added. Wick structure may be used to constantly evaporate a small quantity of the molten metal above the cathode in order to maintain a flux of metallic particles sufficient to sustain the electric glow discharge independently of the neutral gas pressure external to the discharge. Sputtering action produced by ions impinging on the liquid also contributes metal particles to the metallic discharge. The wick eliminates the problem present in most ion pumps of having sufficient particles to continue an ionizing current, or alternatively, of providing an ionizing means such as an electron emitter, so that reliance need not be placed upon a cold cathode discharge. With the latter alone, a pulse pumping effect occurs after initial pumpdown because sufficient random gas molecules must build up to initiate again the electrical glow discharge current.

A large class of liquid metals meet the requirements of gettering metals, e.g., gallium, indium, tin, bismuth, and lead, individually and in various combinations, as well as certain high melting point metals such as tantalum and molybdenum in solid form. Generally, any metal or metal combination will suffice which has a vapor pressure below the order of $10^{-10}$ mm. Hg when in the molten state and which has an affinity for hydrogen, nitrogen, air, and other gases, especially in ionic form, which are encountered in vacuum work.

The liquid gettering metal is preferably continuously withdrawn in small quantities for degassing and then is returned to the vacuum cavity. The metal does not thereby gradually lessen its gettering capacity as an absorption equilibrium is reached. This function is easily provided by incorporation of structure including a small siphon and flash reflux distillation unit operating on a diffusion pump principle. However, the necessity for the desorption unit is not absolute since the amount of metal disposed within the pump may be varied to correspond to the capacity desired. For most low volume pumping operations there is sufficient convective or diffusive motion of the metal to maintain an uppermost film in which absorption equilibrium has not been reached.

The invention represents a unique advance in the vacuum pumping art because of novel structure and because of operational characteristics adaptable to specific pumping operations. Volumes as high as $10^8$ liters per second can be pumped at presures as low as $10^{-10}$ mm. Hg using a Phillips ion gauge electrode configuration in which a quantity of clean liquid gettering metal is disposed over an area of $10^4$ sq. cm. on the lower electrode. There are specific other advantages over other pumps. No fore pump is required. Both fast and slow neutral and ionized gases can be pumped simultaneously. The pump may be scaled to any size. The vacuum attainable is largely independent of pumping action and back diffusion, since virtually 100% of all ionizable gases entering the area between cathode electrodes are ionized and absorbed into the liquid metal.

Accordingly, an object of the invention is to provide a vacuum pump and pumping method capable of pumping gases in a range of pressures from $10^{-3}$ mm. Hg down to $10^{-10}$ mm. Hg and lower.

Another object of the invention is to provide a vacuum pump and pumping method which tends to pump gases on an absolute, positive pumping principle so that there is no backward diffusion of gases and hence no fore pump is necessary.

A further object of the invention is to provide a vacuum pump and pumping method which may be easily scaled up to pump large volumes without exponential increases of pumping energy requirements.

Another object of the invention is to provide a vacuum pump and pumping method in which a pumping action is created by the continuous absorption of ionized gases directed into a liquid gettering metal.

Another object of the invention is to provide an ion pump and pumping method in which ions impinging upon an ion pump cathode plate are absorbed into a liquid gettering metal disposed thereon.

Another object of the invention is to provide an ion pump and pumping method in which ions produced by said pump are absorbed together with neutral particles into a liquid gettering metal disposed within the pump cavity.

Another object of the invention is to provide an ion pump and pumping method in which gaseous particles entering said pumping cavity are ionized and directed into a liquid gettering metal.

Another object of the invention is to provide an ion pump and pumping method of the type indicated heretofore in which the liquid gettering metal is continuously agitated or made to flow along a surface.

Another object of the invention is to provide an ion pump and pumping method of the type indicated heretofore in which a portion of the liquid gettering metal is continuously desorbed to an atmosphere external to the pumping cavity.

Another object of the invention is to provide an ion pump and pumping method in which a residual or background gas pressure is created by vaporization of metal from a heated wick structure partially immersed in a pool of molten metal and against which a continuous pumping action is maintained.

Another object is to provide a pump and method in which a residual or background gas pressure is created by the sputtering action of ions impinging on the liquid cathode material.

Other objects and advantages will become apparent upon consideration of the following description and accompanying drawings, of which:

Figure 1:
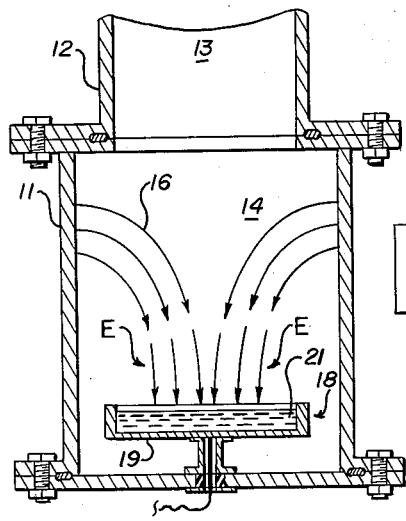
Figure 1 is a cross sectional side view of an embodiment of the ion pump of the invention, partly schematic, in which magnetic and electric field means are provided for the acceleration of ions into a quantity of liquid gettering metal.

In the practice of the invention there will ordinarily be provided a container capable of low vacuum pressure containment and adaptable for connection to the pump of the invention. Initially the container may contain air or some other gas at atmospheric pressure, but where it is to be used for greatest advantage, i.e., maintenance of vacuum pressures in large containers in the vacuum region below $10^{-6}$ mm. Hg, the container will be most frequently pre-evacuated under conditions bringing about degassing of wall surfaces and other surfaces within the container, as with a diffusion pump. Where the vacuum cavity is being used for experimentation or activity in many types of endeavor, such as vacuum space technology, outer space studies, mass spectroscopy, plasma containment, nuclear studies and others, particles other than air or ordinary gases will also tend to be present together with residual or degassed gaseous impurities. Such particles and gases frequently include gaseous ions, elementary energetic particles and lightweight gaseous materials such as diatomic or dissociated hydrogen, deuterium, and tritium. These particles and the gases may have a random thermal motion, but frequently will have an initial directional velocity, over a spectrum of energies rendering immediate vacuum capture difficult or uncertain. Vacuum capture and ejection with negligible back diffusion into the vacuum cavity proper is especially difficult in practice where the aforementioned light gaseous particles, hydrogen, deuterium and/or tritium are present, since the random motion velocities even in relatively unexcited states are extremely rapid. Obviously, in order to attain the most favorable equilibrium, the number of bounces or collisions between gas particles or with non-capturing surfaces must be held at a minimum since the probability of back diffusion thereafter is quite large.

The critical conditions under which vacuums must frequently be maintained are exemplified in plasma containment devices wherein charged particles are contained within a suitable arrangement of electric and magnetic fields housed within a vacuum chamber. Generally, the vacuum container must be evacuated to a base pressure of $10^{-9}$ mm. Hg or lower, exclusive of the centrally contained plasma. Since charged particles may not be inserted directly into the central plasma region because of the restraining magnetic field, various methods of injecting neutral particles are used. For example, directional beams of energetic neutral particles such as hydrogen, deuterium, and tritium may be obtained through collision of energetic beams of charged particles with neutral particles or by charge exchange with charged particles, whereby entrance to the containment region may be made through the electric and magnetic fields thereof. Ions and other elementary particles are created within the containment region by plasma charge exchanges or by nuclear reactions, ionizing collisions, etc. Some of the neutral particles pass completely through the containment region and must be evacuated together with charged particles, degassed impurities, etc.

For most efficient operation in plasma work of the type described the pumping means is disposed in parallel alignment to intercept the residual beam of charged and/or neutral particles, so that most of the particles or gases are trapped prior to the time when they slow down and wander randomly throughout the container. The vacuum cavity may be integral with the pumping cavity, but where pumping against a beam of particles, as aforementioned, a wide mouthed aperture of some depth is preferred to facilitate containment prior to the initial collision. Such problems are not peculiar to plasma containment alone but are encountered in accelerator and other high energy particle fields. Where random or thermal motion is relied upon, as in fields of endeavor where charged particles are normally absent, for introduction into the pumping cavity an aperture wide in relation to the pumping chamber is also preferred to increase the probability of entrance.

In accordance with the invention, stated in simplest terms and shown partly in schematic form in Fig. 1, a vacuum housing 11 is mounted in vacuum tight relation with vacuum tank or inlet means 12 (shown fragmentarily) to communicate therewith through entrance 13. The pump housing defines a pumping cavity 14 in which, or in connection with which, there is provided a means of ionizing gases (not shown) such as a filament which emits electrons or a cold cathode electrode electron discharge, whereby ions are created upon collision or interaction of the electrons with gaseous particles respectively. An electric field indicated by arrows 16 is provided to direct and accelerate ions toward receiving structure 18, shaped to provide receptacle 19. Disposed in the receptacle 19 is a liquid gettering metal 21.

In operation, gaseous particles entering the pumping region are ionized by the ionizing means. Depending upon the source to be evacuated, gaseous particles already in ionized form may also enter the pumping cavity. These ions are directed by the electric field toward and accelerated into the receiving structure 19. A portion of the ions, and perhaps other particles, are driven into or strike the surface of liquid gettering metal pool 21. By a process of chemical combination, or possibly other processes, the particles tend to remain within said liquid metal, or are desorbed only at a very slow equilibrium rate which depends upon the extent to which the metal is saturated with gaseous particles. Continuous desorption and liquid motion is optionally provided by a desorption unit (not shown) discussed hereinafter. Gaseous molecules which contact the metal because of their random motion only, will of course tend to be absorbed thereon reversibly, with a consequent higher desorption rate. The processes of sputtering will cause desorption at an undetermined rate, and in the instance of a beam of highly charged particles it may be necessary to tilt the plane of the metal surface with respect to a plane normal to the beams in order to preclude sputtering back into the cavity being pumped.

Figure 2:
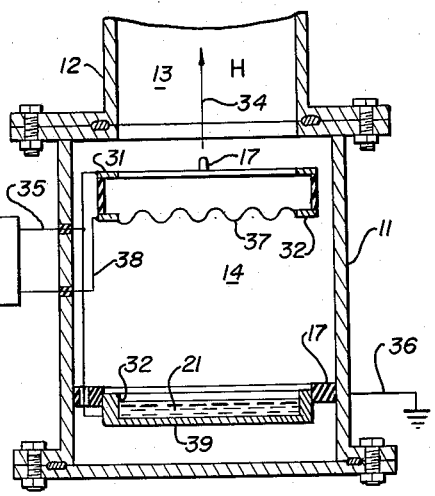
Figure 2 is a cross sectional side view of an embodiment of the ion pump of the invention having an upper horizontal ring electrode coaxial with respect to the pump inlet and a lower horizontal electrode having a liquid gettering metal disposed thereon.

In the preferred embodiment of the invention there is provided in combination a conventional ion pump having a "Penning" discharge in which the liquid gettering metal is disposed on a lower horizontal cathode electrode for receipt of ions impinging thereupon. More specifically, as shown in Fig. 2 there is provided a vacuum cavity 14 defined by pump housing 11 connected through entrance 13 to vacuum inlet means 12. Disposed within the pumping cavity 14 in generally opposing horizontal positions and preferably in a geometry to admit gas from entrance 13 therebetween are upper ring and lower plate cathode electrodes 31 and 32, respectively, supported by conventional means 17 extending in insulated vacuum tight relation through anode housing 11. The electrodes 31 and 32 are energized with alternating or direct voltage by means of leads 35 connected to an A.C. or D.C. power supply 33, respectively. A constant or rapidly time-varying magnetic field having a direction as indicated by the letter "H" and arrow 34, normal to the cathode surfaces, is created between the two electrodes 31 and 32 by a magnet (not shown) exterior to the wall 11. The chamber anode wall 11 operates at ground potential as indicated at 36. Optionally, ionizing means is disposed within cavity 14, i.e., filament 37 is spaced below electrode 31 and connected by means of lead 38 to a suitable tap of power supply 33 to operate the filament at a potential which will withdraw electrons from said electrode 31. All of the foregoing elements of Fig. 2 are conventional in various known ion pumps and are presented herein merely for purposes of illustration.

In such conventional ion pumps without the filament 37, electrons emitted by cold cathode discharge oscillate between electrodes 31 and 32 due to the action of the magnetic field 34 and the alternating electric field established by the potentionals applied to the electrodes. The oscillating electron stream initiates ionization of gas molecules entering pumping cavity 14 from the vessel to be evacuated and ionization of gases is continuous as long as substantial amounts of gases are present. Optionally, filament 37 may be used to ionize gases. The ions thus produced are accelerated into electrodes 31 and 32 and collected thereon to produce a pumping action.

Normally, in the prior art of ion pumps, ions directed toward and accelerated into the electrodes are at once neutralized and captured until saturation of the cathodes occurs. After cathode saturation, impinging ions become free to migrate away from the electrodes as neutral atoms and molecules. Various methods have been used to remove such accumulations of neutralized gases. For example, the inlet of a diffusion pump (not shown) is frequently located at the collecting cathode, or ring and grid structure (not shown) are employed to accelerate ions and gases into an outlet chamber.

Figure 3:
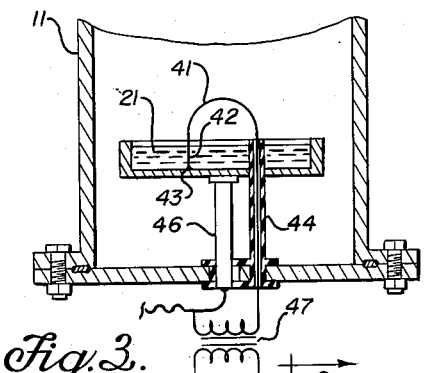
Figure 3 is a cross sectional view of a portion of an ion pump similar to the pump of Figure 2 in which wick means for continuously vaporizing a portion of the liquid metal is additionally provided.

In accordance with the salient features of the present invention, a liquid getting metal 21 is disposed within the pumping chamber. Specifically, in the preferred embodiment there is provided integral with the upper surface of horizontal lower cathode electrode 32, shown in Fig. 2, a dished receptacle 39 having therein a liquid gettering metal 21 of low vapor pressure as provided hereinafter. The metal preferably covers a large portion of the upper surface of the electrode. Optionally, in the preferred embodiment, there is also provided novel wick ionizing means for continuously providing a partial gas pressure to sustain the electric discharge, and a means of continuously degassing a portion of the liquid metal exterior to the pumping cavity. Specifically, in Fig. 3 there is shown a wick 41 of metal having a high melting point extending out of said liquid 21 in which it is immersed at 42 and attached therein to the cathode electride structure at 43. The wick above the liquid is joined by means of insulated lead 44 with structure of equal potential to said electrode at 46. Sufficient potential to cause current to flow through the wick is added to the potential of the cathode electrode as by means of transformer 47 to bring about $I^2R$ heating. When the wick becomes hot, the liquid wets and flows over it and is evaporated.

Figure 4:
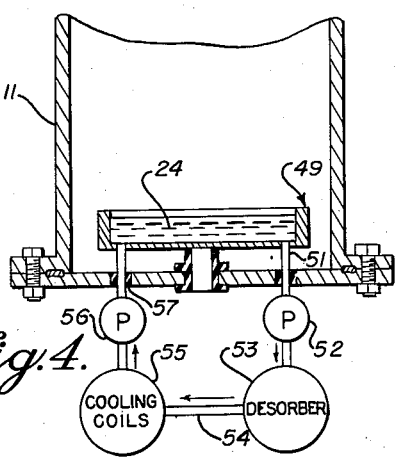
Figure 4 is a cross sectional view of an ion pump similar to the pump of Figure 2, partly schematic, in which desorber means for the metal is additionally provided.

A gas desorption means in combination with an electrode receptacle 49 is shown in Fig. 4. Liquid transmitting means, such as pipe 51, which by virtue of pumping means 52 through it passes, continuously or intermittently withdraws a portion of liquid 24 from said receptacle 49 and feeds same to desorption means 53. The desorption means may operate in the same manner, for example, as an ordinary sealed-inlet diffusion pump backed by a conventional fore pump, as discussed and shown hereinafter. A second liquid transmitting means 54 passing through cooling means 55 and pumping means 56 continuously or intermittently returns a portion of partly or wholly degassed liquid 24 to receptacle 49. Removal and addition of liquid to the receptacle 49 serve to maintain the entire amount of liquid metal 24 in motion. The liquid transmitting means is of course suitably insulated at 57 where it passes through pump housing 11. Desorber 53 must be suitably insulated from ground potential since the molten metal is capable of conducting current.

Optionally, mechanical pumping means may be coupled to the pumping cavity through an outlet for preliminary outgassing (not shown).

In operation of the preferred embodiment having the wick and desorber units in combination therewith, the magnetic and electric fields are energized at suitable field strengths, as hereinafter indicated. An additional potential is maintained across the wick loop, inducing current flow and producing heating. As the wick heats, liquid metal is drawn upward thereupon by surface tension forces. A portion of the metal evaporates. Spurious electrons from cosmic rays or from cathode electrodes or other means cause initial ionization of gases between the electrodes and ions are continuously thereafter formed by ionizing collisions as long as more gaseous molecules are introduced into the cavity. The vaporizing liquid metal is also ionized and by regulation of the metal vapor density a constant "ion current" is maintained in an electric discharge after insufficient air or gas alone is present to continuously produce ions. Ions impinging upon the upper electrode are neutralized and migrate elsewhere. Those impinging upon surface of the liquid metal of the lower electrode are absorbed within the metal, thereby creating a pumping action. Circulation of liquid metal through the diffusion desorption means enables continuous operation for an indefinite length of time.

Both the wick and desorption means may be eliminated from the preferred embodiment in certain types of operations. The function of the wick is to provide a constant source of vaporized particles. These gaseous particles are constantly ionized by collisions with electrons or other ions and therefore support the production of more ions indefinitely. When the wick means is not present ionization of gaseous particles ceases after initial depletion of gaseous molecules, i.e., after the pumping cavity and vacuum container are pumped down to a pressure of about $10^{-4}$ mm. Hg. This happens because insufficient ions or electrons are present between the cathode electrodes thereafter to ionize each random gas particle as it enters the volume therebetween. Only when increasing numbers of gaseous molecules appear, however, is a threshold pressure reached at which continuous production of ions is again possible. Such production is initiated by spurious ions or electrons and the container again pumps down to the lower pressure limit. This discontinuous or "pulse" pumping continues indefinitely, except that no pumping is achieved below the lower pressure limitation. Obviously, lower pressures and higher volumes may be pumped when gaseous molecules are ionized immediately upon entrance into the pumping cavity, as by the wick means, the sputtering means, or the filament means of the prior art.

Since the capacity of a gettering metal for the absorption of gases is generally rather large, being of the order of 1 atmospheric cc. per gm. of metal, desorption of the metal is not necessary for short pumping times or for small volumes of gas. Agitation of the liquid metal by some means which will bring about a motion thereof, however, may be preferred in certain instances when means for continuously desorbing the liquid metal is not provided. This insures continuous mixing of the absorbed and clean liquid, so that the metal at the metal-vacuum interface does not consist entirely of molecules having gases absorbed thereon.

Figure 5:
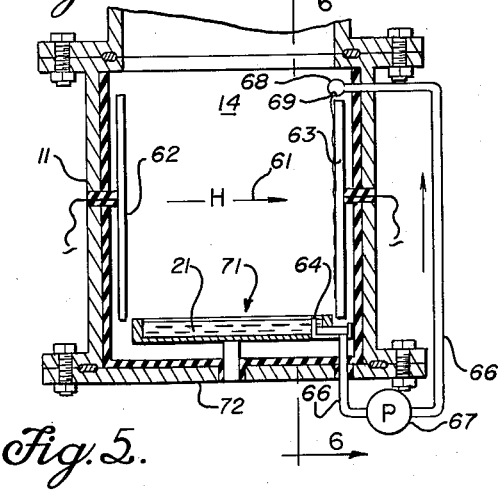
Figure 5 is a cross sectional view of an embodiment of the pump in which the liquid metal is flowably disposed over a vertically disposed electrode.
Figure 6:
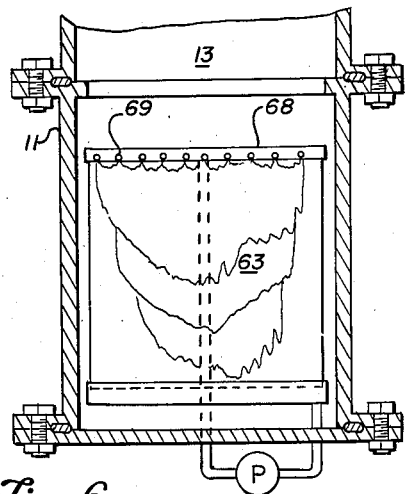
Figure 6 is a cross sectional side view of the inlet tube and electrode plate arrangement of Figure 5, taken along line 6—6 of Fig. 5.

Alternatively, other structure and other embodiments may be substituted for the preferred embodiment discussed hereinabove, particularly with respect to electrode structure and metal disposition. For example, the cathode electrodes may be vertically as well as horizontally disposed with consequent advantages in absorption of high speed particles as shown in Figs. 5 and 6, in which the magnetic field as indicated by arrow 61 is normal to vertical cathode electrodes 62 and 63. In this instance the liquid metal 21 is cycled to fall continuously as a film 21 over the facing surface of electrode 63. Specifically, liquid metal 21 is pumped by means of pump 67 from open, insulated reservoir 64 through liquid transmission means 66 to outlets 69 spaced along the top of electrode 63 to drain and fall by gravity over the electrode surface. At the base of electrode 63 the liquid is collected in the open reservoir 64. The reservoir, piping, and pump are in conducting relation with said electrode 63. Further, liquid 21 is disposed in receptacle 71 along base 72 at ground or anode potential. In operation gaseous molecules entering cavity 14 with a directional velocity tends to strike liquid metal 21 in container 71 with consequent absorption without prior ionization. Molecules leaving the container 71 or which enter the pumping cavity randomly are ionized as before and drawn into one of the cathode electrodes 62 or 63. Similar embodiments in which liquid metal is disposed upon both electrodes and upon adjacent wall structure to cooperate in the capture of molecules and ions may also be employed.

Figure 7:
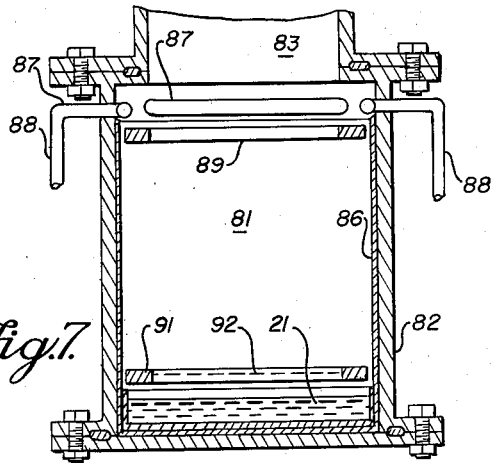
Figure 7 is a cross sectional side view of an embodiment of the pump in which the liquid gettering metal is disposed about the pumping cavity completely separated from the pump electrodes.

In Fig. 7 there is shown an alternate embodiment for accelerating charged particles into liquid metals in which the liquid gettering metal is disposed entirely on surfaces adjacent to the cathode electrodes. Specifically the embodiment comprises a vacuum cavity 81 defined by structure 82 and having an upper inlet 83. Liquid gettering metal 21 is disposed on the flat bottom surface 84 of said structure 82. Additional liquid metal is introduced upon the upper wall surface at 86 of three sides by means of perforated inlet tubes 87 connected with liquid transmitting means 88 passing through the cavity structure 82 to an outside source of liquid metal from which metal is pumped (not shown). Horizontal ring cathode electrodes 89 and 91 supported by insulated support members (not shown) extending in vacuum tight relation through the front wall structure (not shown) are disposed coaxially with inlet 83 within cavity 81. Lower electrode 91 operates at a higher potential than electrode 89 and serves as a grid, there being conventional grid structure 92 disposed across the axial aperture thereof. In operation ions are formed in the space between rings 89 and 91, and some of them are drawn through grid 92 into liquid metal 21. Because of the large wall surface area within the cavity over which liquid metal is also disposed, gaseous molecules will also tend to be absorbed therein. Ions entering the cavity through inlet 83, as from an ion beam, will also tend to be accelerated into the lower liquid 84. Other geometries may be substituted in similar embodiments in which electrode structure is entirely separated from the absorbing liquid metal.

Figure 8:
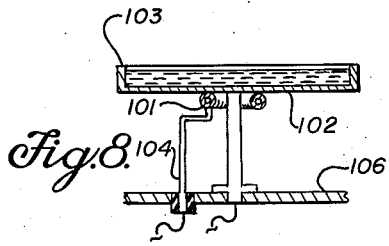
Figure 8 is a cross sectional side view of a horizontal pump electrode having liquid gettering metal disposed thereon and around which a heating unit is provided therefor.

Gettering metals suitable for use in the invention are selected from the various metals, metal alloys, and metallic mixtures having gettering characteristics for air or the particular gases which are desired to be outgassed, the nature of this gettering property or gaseous absorption phenomena being discussed hereinafter. The metal selected should additionally have a suitable low vapor pressure, i.e., less than $10^{-11}$ mm. Hg in the liquid state and also a low melting point for practical use. Metals having high melting points, such as tantalum, molybdenum, etc., are generally excluded for most applications because of the impracticability of maintaining them in a liquid state because of their high vapor pressures when liquid. Heating of the metal to prevent solidification may be desirable in some instances, as shown by the insulated resistance heater 101 of Fig. 8 encircling the underside 102 of electrode 103. Heater 101 is held in rigid relation by insulated conducting support 104 communicating through wall 106.

Removal of gases from the metal 21 to a point below the equilibrium saturation point at the conditions of contemplated use is also requisite to operation of the invention; this may be accomplished initially by vacuum distillation or other conventional means. While many metals are known in the art which getter gases, specific metals having low vapor pressures, low melting points, and suitable absorption and desorption properties for most of the common gases used in ultra-high vacuum work include gallium, indium, tin, bismuth, and lead and mixtures and alloys thereof. Pertinent physical properties of these metals and several alloys thereof are shown in Table I. The ability of the liquid metal to wet the conducting surface is not necessarily indicative of the potential which may be maintained across the liquid-solid interface with respect to ground. Alternatively, other metals may be selected.

TABLE I

| Metal alloy, Percent Wt. | Melting point, °C. | Vapor pressure | |
|---|---|---|---|
| | | mm. Hg | °C. |
| Gallium | 29.9 | $10^{-8}$ | 500 |
| Indium | 156.4 | $10^{-8}$ | 500 |
| Tin | 231.9 | $10^{-8}$ | 500 |
| Bismuth | 271.0 | $10^{-8}$ | 300 |
| Lead | 327.4 | $10^{-8}$ | 350 |
| 62.5 Ga, 21.5 In, 16 Sn | 10.7 | $10^{-8}$ | 500 |
| 62 Ga, 25 In, 13 Sn | 5 | | |
| 69.8 Ga, 17.6 In, 12.5 Sn | 10.8 | | |
| 76 Ga, 24 In | 15.7 | | |
| 92 Ga, 8 Sn | 20 | | |
| 70 Ga, 30 Sn | 60 | | |
| 49 Bi, 18 Pb, 12 Sn, and 21 In | 57.8 | | |
| 49 Bi, 18 Pb, 15 Sn, and 18 In | 57.8–69 | | |
| 32.7 Bi, 7.5 Pb, 16.7 Sn, and 43.1 In | 58.8 | | |
| 49.5 Bi, 17.6 Pb, 11.6 Sn, and 21.3 In | 58.2 | | |

Using the liquid metals gallium, indium, tin, bismuth and lead, and alloys thereof, discussed hereinabove, gettering may be restricted to the gases air, nitrogen, oxygen, hydrogen, tritium, deuterium and in general all gases which may be chemi-sorbed with these metals. This list is inclusive of most of the gases commonly used in vacuum work except the inert gases. The exact nature of the absorptive bonding forces between the gas and metal molecules is unknown. However, with many gases chemical combination appears to occur, in which a chemical compound is formed by a reversible chemical reaction; i.e., hydrogen, deuterium, tritium, and perhaps other gases combine directly with the metal to form loosely held combinations. Energy requirements for dissociation of these compounds, e.g., hydrides and nitrides, are relatively low, of the order of 30–70 Kcal./mole, which may be provided generally by heating.

Degassing may therefore be conveniently accomplished by simple vaporization or distillation of the metal. Certain other gases, notably oxygen, may combine to form compounds which cannot be dissociated by simple heating. If desired, means may be provided to remove such compounds from the circulating metal system, or the spent metal can be replaced with fresh clean metal at intervals during lengthy continuous gettering operations. For short runs in which the absorptive capacity of the metal is not reached, replenishment has been found unnecessary to operation even at the lower limit of vacuum pressures attainable with the invention. Even with oxygen a large portion of the gas is held by forces other than strict chemical combination, i.e., sorption phenomena in which Van der Waal type forces appear to be the main causative factor. Although separation energies for these combinations are low, being of the order of 10 Kcal./mole, equilibrium rates heavily favor retention of the gases within the metal, and there is effective gettering irrespective of the sorption mechanism. The inert gases are not sorbed to the extent other gases are retained, but sorption is sufficient to create a pumping action.

Initial sorption is dependent to a large extent upon the force with which gaseous molecules strike the surface of the metal. A significant portion of molecules striking the metal with only thermal motion velocities escape so that the pumping action thereby would be significantly slowed down and restricted to pressures not as low as those attainable with ion pump embodiments. Specifically, thermal velocities do not generally exceed $10^5$ cm./sec., while impingement velocities range upward to $10^8$ cm./sec. in conventional ion pumps with a potential of 3 kv. on the cathode electrodes. Little or no desorption from liquid metal disposed on a cathode has been observed to occur at these latter cathode potentials.

Sputtering thresholds for most materials occur at $\sim 100$ volts applied to the electrodes.

In the selection of a particular gettering metal for a given pumping embodiment, consideration must also be given to the temperature of operation of the pump and/or the vacuum device with which it is connected. In certain types of ultra-high vacuum work, high bakeout temperatures are requisite to vacuum operations. Heat is also generated by the impingement of ions into the metal and by resistance to flow of current. A gettering metal must therefore be selected in which sorption is favored at the temperature of operation.

As indicated hereinbefore, the absorption mechanism is reversible for most gases and metals, and as the liquid gettering metal absorbs more and more gas per unit amount of metal an absorption-desorption equilibrium is attained. Desorption of the metal at a point prior to saturation with gas is therefore necessary to maintain efficient pumping. Any one of the numerous methods known in the art may be used to accomplish desorption. For example, considerable desorption occurs through simple outgassing with a mechanical pump, particularly at elevated temperatures; by use of the heating means discussed hereinbefore and exemplified in Fig. 8, such degassing may be accomplished within the pumping cavity 14 of the preferred embodiment during periods of inoperation by coupling the pumping cavity inlet 13 with a diffusion pump instead of with a vacuum chamber.

Figure 9:
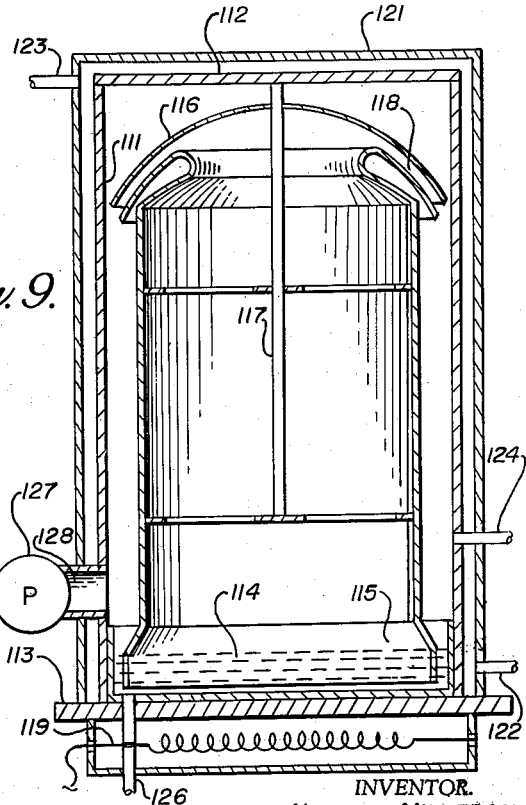
Figure 9 is a cross sectional side view of a desorber embodiment.

Details of the desorption means of the preferred embodiments are shown in Fig. 9 in which there is a cylindrical inner housing 111 closed by the top 112 and bottom 113 to define a well containing a quantity of the liquid gettering metal 114 to be used in a particular embodiment of the invention. Bell structure 116 suspended from top 112 by supporting structure 117 extends into the well far enough to penetrate the surface of the liquid metal 114, but does not touch bottom 113. Nozzles or jets 118 at the top of the bell within housing 111 provide an outlet for vapors formed when metal 114 is heated by heating means 119. Container 111 is jacketed for circulation of a coolant with jacket 121, the coolant entering at entrance 122 and leaving at exit 123. Spent or partially spent metal is introduced continuously or intermittently into container 111 through inlet 124 and an outlet for partially desorbed metal is provided at 126. Mechanical pump means 127 is connected to the container 111 exterior of bell 116 through port 128. The aforegoing structure is conventional within the art except for metal entrance and exit means 124 and 126 and is similar in all respects to other diffusion pumps except that top 112 seals off the usual entrance means of gases to be pumped. In operation a portion of the liquid metal 114 is vaporized by application of heat. Absorbed gaseous molecules are dissociated and/or desorbed during the application of heat and are ejected through jets 118 together with metal vapors, the latter of which condense upon contact with the cool wall surface of housing 111. Separation of condensed metal from spent metal 114 in the well 115 is generally not necessary since spent metal is substantially completely degassed by the application of heat prior to vaporization.

The absolute lower pressure obtainable with the pump is dependent upon the efficiency of the pump in ionizing gaseous molecules immediately upon their entrance into the pumping cavity and in drawing the ions into the liquid metal. In practice, using cathode plates of comparable size with the prior art and with corresponding electric and magnetic field potentials, pressures as low as $10^{-10}$ mm. are obtainable in pumping small volumes. Volumes as high as $10^7$ l./sec. may be pumped while maintaining a pressure of $10^{-8}$ mm. Lower pressures cannot be obtained unless special precautions are taken to limit backward diffusion. The reason for this is that a certain amount of the vaporized metal, or alternatively, gas entering the pumping cavity by random motion, escapes back into the vacuum cavity before being ionized.

The efficiency of the pump is largely dependent on the vapor pressure of the liquid gettering metal. The reason for this is that metal vapors cannot be ionized and driven back into the electrode structure before they can back diffuse. A reasonably low metal vapor pressure is desired in order to limit the diffusion of metal vapors into the vacuum cavity during inoperative periods.

The magnitudes of the electric and magnetic fields necessary to achieve efficient pumping action do not differ significantly from those required for conventional ion pumps of comparable small capacities. Specifically, pressures as low as $10^{-9}$ mm. may be attained with the preferred embodiment in which a potential of 5 kv. is maintained on flat cathode electrodes a distance apart equal to the diameter of the anode. A magnetic field determined by the radius of curvature of electrons of 5 kv. is required. Electrodes must be of a diameter approximately ½ cm. less than inside diameter of anode. Unlike conventional ion pumps the present invention need have sufficient magnetic field only to contain electrons oscillating between electrodes, whereas prior ion pumps have generally required a field sufficient to move the ions out of the pumping cavity, as by use of a ring type electrode coaxial with an outlet from the pumping cavity. Because less work is done on the ions, a proportionally smaller magnetic field is therefore required in scaling up the present invention to larger sizes; the field required for a given embodiment is less than conventional ion pumps by a factor comparable with electron to ion mass ratios. Consequently large models are more feasible technically to build.

In addition to the requisite high melting point and chemical compatibility, the wick must be capable of being wet by the liquid metal selected. Wetting can be achieved by conventional cleansing or ultra-sonic techniques. In practice, three or four strands of 1 to 15 mil tungsten or molybdenum wire twisted together have been found satisfactory for vaporizing metals of the type comprising gallium, tin, indium, bismuth, and lead discussed hereinbefore. By employing such a wick material at a temperature of about 2000° C., metallic vapor pressures of between $10^{-3}$ mm. and $10^{-5}$ mm. may be attained between cathode plates one anode diameter apart when no current is applied thereto. Pressure regulation may be accomplished by varying the temperature of the wick, by the size and number of strands of wire, etc. While in the preferred embodiment the rate of vaporization is regulated to completely ionize all metal particles, the rate may alternatively be increased to provide more vapor than would be ionized in a given embodiment, just as at high pressures not all gaseous molecules entering the pumping region are immediately ionized. Such metallic gases would travel in a "line-of-sight" direction from the wick and condense on any cool wall surface or other structure which it contacted. Such condensed metals would thereafter tend to further absorb gases.

The wick may also be used as a metal vapor source in the vapor deposition of liquid metals in instances where the pool of liquid metal out of which the wick is appended does not serve as any gettering or sorption function for gases. For example, the wick may be used to provide a continuous background of residual pressure between Phillips ion gauge cathode plates as in pump embodiments of the prior art where continuous ionization is desired. A pumping action may also be brought about in such an embodiment by the gettering action exerted by the absorption into metal continuously deposited upon the collecting plates.

The invention will be better understood upon consideration of the following examples.

Example I

Figure 10:
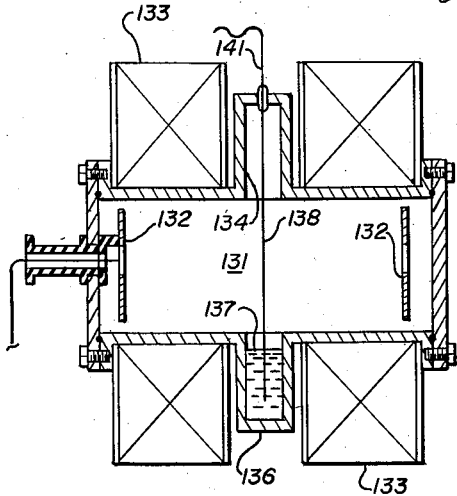
Figure 10 is a cross sectional side view of an embodiment in which the liquid metal provides a source of metal for the metal wick alone.

An experiment was conducted in which a tungsten wire wick was successfully used to evaporate a liquid gettering metal between the cathode electrodes of a Phillips ion gauge type pump operating to create a pumping action. Specifically, an embodiment was employed substantially the same as that shown in Fig. 10 having a horizontal cylindrical chamber 131 with insulated cathode electrodes 132 at each end. Magnets 133 encircle each end of chamber 131 to substantially envelope each half thereof, except for the center portion intersected by closed vertical cylinder 134. In the lower portion of the cylinder is an open mouthed container 136 containing a liquid metal 137 consisting of indium metal having a melting point of 155° C. A tungsten wick 138 consisting of four twisted strands of 6 mil wire was fastened into the bottom of the container and extended upward through the pumping chamber. The wick was suitably connected through seal 141 to an alternating current power source (not shown) operating at 15 amps. so that the temperature of the wick was maintained at 2000° C. during operation. The horizontal chamber 131 and vertical tube 134 were sealed off from the atmosphere. The total volume of the vacuum tight area was ½ liter. The magnetic field maintained was ~300 gauss in an annular region between the washer shaped cathodes. The electrical potential on the cathode electrodes was 4.5 kv. Evaporation rate measurements made by weighing a surface covered by the evaporating indium, but without an electric or magnetic field, showed a metal vapor pressure of from $1 \times 10^{-3}$ to $1 \times 10^{-5}$ mm. Hg without either electric or magnetic fields operating. During application of magnetic and electric fields for one hour the total pressure of the container was lowered to $1 \times 10^{-6}$ mm. Hg.

Example II

An experiment was conducted in which a pumping action was established by the sorption of ions into a liquid gettering metal disposed on the horizontal cupped surface of a Phillips ion gauge cathode electrode. Specifically, in an embodiment similar to the one shown in Fig. 2, the lower horizontal electrode of a Phillips ion gauge pump was fashioned in the shape of a shallow cup having a planar 16 sq. in. surface area taken as the plane formed by the uppermost portion of the lip. An amount of liquid gettering metal, 400 gms., consisting of an alloy of Bi, Pb, Sn, In, having a melting point of 58.8° C. was disposed in the dished electrode. The electrodes were disposed 4½ inches apart in a 25 liter system. An electrical potential of 4–5 kv. direct current was maintained upon the electrodes, and a magnetic field of 150 gauss was established in a direction normal to the cathode plates. In operation pulse pumping of air was observed, in which ions were first sorbed into the liquid gettering metal until a lower pressure than $2 \times 10^{-3}$ mm. was attained. At this point there was insufficient residual pressure to maintain ionization and the pumping action therefore ceased. The pressure then rose in about 5 seconds to $5 \times 10^{-3}$ mm. Hg as determined by the leak and degassing rates at which point ionization and pumping commenced spontaneously. Thereafter pumping to the lower pressure in about 0.01 second was followed by building up of the pressure to the higher pressure in about 5 seconds and this phenomenon was alternately observed over a period of several hours. No attempt was made to agitate or circulate the liquid; however, the liquid was degassed immediately prior to use by heating in the cathode dish in vacuum and removing the evolved gases by means of a diffusion pump.

Example III

An experiment was conducted in which a continuous pumping action was maintained in a Phillips ion gauge pump having a liquid gettering metal disposed upon a lower horizontal electrode from which a portion of the liquid metal was continuously vaporized to create a residual pumping pressure by means of a heated metal wick appending from the pool of liquid metal. More specifically, a Phillips ion gauge pump adapted for use with the liquid metal and wick was connected through a 3½ sq. in. annular aperture with a vacuum cavity resulting in a vacuum system of 25 liters. Specifications for the equipment were as follows:

Surface area of each facing electrode: 16 sq. in.
Distance between electrodes: 4½ in.
Potential applied to electrodes: 4–5 kv.
Surface area of liquid metal on lower electrode: 16 sq. in.
Metal used, and total amount: Alloy of Bi, Pb, Sn, In; 400 gms.
Melting point of metal: 58.8° C.
Magnetic field between electrodes: 150–200 gauss
Size and type of metal wick: Three strands .020 in. diameter, tungsten
Operating temperature of wick: ~2000° C.
Metal vaporized by wick per unit time: ~$4 \times 10^{-4}$ gms./sec.

In operation the vacuum cavity was first pumped down for 8 hours with a diffusion pump to about $3 \times 10^{-7}$ mm. Hg in order to degas the vacuum cavity walls. Desorbed liquid metal was disposed upon the cupped electrode. The magnetic and electric field means were then energized, and pumping to a base pressure of $10^{-4}$ mm. was observed for 1 hour. No attempt was made during operation to agitate or to desorb the gas from the metal, as by circulation through a vacuum distillation column.

While there has been described what is, at present, considered to be the preferred embodiment of the invention, it will be understood that various modifications may be made therein, and it is intended to cover all such modifications as fall within the scope of the appended claims.

What I claim is:

1. In a vacuum ion pump the combination comprising containment means, a quantity of liquid gettering material disposed therein, and magnetic and electric field means disposed to direct and accelerate gaseous ions within said containment means toward said liquid.

2. In an ion pump the combination comprising containment means, a quantity of liquid gettering material disposed therein, means for ionizing gases within said containment means, and magnetic and electric field means disposed to direct and accelerate at least a portion of said gaseous ions within said containment means toward said liquid.

3. In an ion pump having means for ionizing gases within the pumping cavity and electric and magnetic field means for directing the motion of said ions toward electrode structure, the combination comprising a quantity of liquid gettering metal disposed in relation to said electric and magnetic field means to receive and absorb at least a portion of said ions.

4. In an ion pump for continuously pumping ionized gases, the combination comprising containment means defining a pumping cavity, electrode structure therein, means for ionizing gases therein within line-of-sight of said electrode structure, electric and magnetic field means disposed to direct and accelerate said ions towards said electrode structure, and a liquid gettering metal disposed in relation to said electrode structure to receive and absorb a portion of said ions directed thereto.

5. The ion pump of claim 4 in which said electrode structure comprises at least one collecting surface, and said liquid gettering metal is disposed in contiguous relation therewith.

6. The ion pump of claim 4 in which heating means is provided to keep the metal in the liquid state.

7. The ion pump of claim 4 in which means are provided for withdrawing a portion of said metal from said containment means, at least partially degassing same, and returning said degassed metal to said point of disposition.

8. The ion pump of claim 4 in which ionization means is provided by filament structure discharging electrons.

9. The ion pump of claim 4 in which there is additionally provided a wettable metal wick disposed to extend from said spool of liquid gettering metal and means for heating said wick, whereby surface tension forces act upon said liquid metal to bring about wetting of said wick and vaporization therefrom.

10. In an ion pump for continuously ionizing and removing gases from a vacuum cavity, the combination comprising containment means defining a pumping cavity having an entrance thereto, two parallel spaced Phillips ion gauge type electrode members therein, electric and magnetic field means disposed to direct and accelerate ionized gaseous particles toward at least one of said electrode members, and a liquid gettering metal disposed in relation to said electrode structure to receive and absorb a portion of said ions directed thereto.

11. The ion pump of claim 10 in which one of said parallel electrodes defines a ring adjacent to and coaxial with said entrance to said pumping cavity and said gettering metal is disposed on the opposing structure of said other electrode.

12. The ion pump of claim 10 in which one of said parallel electrodes defines a ring adjacent to and coaxial with said entrance to said pumping cavity, and said other electrode defines a grid structure operable to accelerate ions therethrough and said gettering metal is disposed on structure distal to said electrode from said grid.

13. The ion pump of claim 10 in which said gettering metal is flowably disposed on an inclined surface within said pump.

14. In an ion pump for continuously ionizing and removing gases from a vacuum cavity, the combination comprising containment means defining a pumping cavity having an entrance thereto, two parallel spaced Phillips ion gauge type electrode members therein, electric and magnetic field means disposed to direct and accelerate ionized gaseous particles toward at least one of said electrode members, a liquid gettering metal disposed in relation to said electrode structure to receive and absorb at least a portion of said ions directed thereto, a wettable metal wick disposed to extend from said liquid gettering metal in a line-of-sight from said inner electrode surfaces and resistance means for heating said wick, whereby surface tension forces act upon said liquid metal to bring about wetting of said wick and vaporization therefrom.

15. The ion pump of claim 14 in which said wick comprises at least one strand of wire less than 10 mils in diameter selected from the group consisting of W, Ta, Mo, and Nb.

16. A process for pumping gases at low pressures, comprising the steps of ionizing said gases and electrically and magnetically directing said ionized gases into a quantity of liquid gettering metal.

17. A process for continuously removing gaseous ions collected in an ion pump having means for ionizing gases and means for electrically and magnetically directing and accelerating the travel of said ions, comprising the steps of disposing a liquid gettering metal in relation to said electric and magnetic means to receive a portion of said ions and thereafter absorbing and collecting ions therein while said pump is in operation, whereby a positive pumping effect is achieved.

18. A process for continuously pumping gases in a vacuum pressure ion pump comprising the steps of ionizing gases entering said pump and thereafter directing at least a portion of said ions by electric and magnetic means into a quantity of liquid gettering metal.

19. The process of claim 18 in which said liquid gettering metal is disposed in contiguous relation to one collecting surface of a Phillips ion gauge electrode.

20. The process of claim 18 in which a quantity of liquid gettering metal is continuously vaporized from said quantity disposed within said pump by a wettable resistance heated metal wick extending therefrom in line-of-sight of said means for creating ions, whereby a background pressure is provided against which said apparatus pumps.

References Cited in the file of this patent

UNITED STATES PATENTS

| | | |
|---|---|---|
| 2,469,626 | Beers | May 10, 1949 |
| 2,489,891 | Hull | Nov. 29, 1949 |
| 2,883,568 | Beam | Apr. 21, 1959 |